(12) United States Patent
Yabushita et al.

(10) Patent No.: US 11,964,607 B2
(45) Date of Patent: Apr. 23, 2024

(54) VEHICLE, UPPER UNIT, AND CONTROL DEVICE

(71) Applicant: TOYOTA JIDOSHA KABUSHIKI KAISHA, Toyota (JP)

(72) Inventors: Hiroki Yabushita, Toyota (JP); Keiichi Kondo, Chiryu (JP); Kaori Takahashi, Nagoya (JP); Jin Xin, Nagoya (JP); Daisuke Mizushima, Toyota (JP); Satoru Ando, Nagoya (JP); Takeshi Murakami, Okazaki (JP); Yuchi Yamanouchi, Toyota (JP); Kenta Miyahara, Toyota (JP); So Sawahira, Toyota (JP); Rina Mukai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 818 days.

(21) Appl. No.: 16/950,180

(22) Filed: Nov. 17, 2020

(65) Prior Publication Data
US 2021/0155146 A1 May 27, 2021

(30) Foreign Application Priority Data

Nov. 21, 2019 (JP) .................................. 2019-210658

(51) Int. Cl.
| | |
|---|---|
| *B62D 63/02* | (2006.01) |
| *B60P 3/32* | (2006.01) |
| *B60P 7/08* | (2006.01) |
| *B62D 63/04* | (2006.01) |
| *B65G 67/20* | (2006.01) |

(52) U.S. Cl.
CPC ............... *B60P 7/0807* (2013.01); *B60P 3/32* (2013.01); *B62D 63/025* (2013.01); *B65G 67/20* (2013.01)

(58) Field of Classification Search
CPC ........ B60P 7/0807; B60P 3/32; B62D 63/025; B65G 67/20
See application file for complete search history.

(56) References Cited

U.S. PATENT DOCUMENTS

| | | | |
|---|---|---|---|
| 3,317,219 A | 5/1967 | Hindin et al. | |
| 2004/0069545 A1* | 4/2004 | Chernoff | B62D 63/025 180/65.1 |
| 2012/0181100 A1* | 7/2012 | Halliday | F41H 1/02 89/930 |
| 2020/0139802 A1 | 5/2020 | Nagasaka | |

(Continued)

FOREIGN PATENT DOCUMENTS

| | | |
|---|---|---|
| CN | 107444151 A | 12/2017 |
| CN | 107765758 A | 3/2018 |

(Continued)

*Primary Examiner* — Bryan A Evans
(74) *Attorney, Agent, or Firm* — Sughrue Mion, PLLC

(57) ABSTRACT

A vehicle loads at least one of a plurality of upper units having space to store a person or an object on an under unit including a drive mechanism that rotates wheels in the vehicle. The vehicle includes an under unit including a drive mechanism that rotates wheels and the at least one of the plurality of upper units loaded on the under unit. The under unit includes a loading unit, on which the at least one of the plurality of upper units as described above can be loaded. Each of the plurality of upper units includes a joint that joins to a different upper unit that is adjacently loaded.

18 Claims, 15 Drawing Sheets

(56) References Cited

U.S. PATENT DOCUMENTS

| | | | | |
|---|---|---|---|---|
| 2021/0061157 A1* | 3/2021 | Castillo | ............... | G05D 1/021 |
| 2021/0080974 A1* | 3/2021 | Mackin | ............... | G05D 1/0291 |
| 2021/0094459 A1* | 4/2021 | Caynak | ............... | B60K 17/354 |

FOREIGN PATENT DOCUMENTS

| | | | |
|---|---|---|---|
| CN | 208158219 U | 11/2018 |
| JP | 4843306 U | 6/1973 |
| JP | 61-104985 A | 5/1986 |
| JP | 2013-162567 A | 8/2013 |
| JP | 2018-176798 A | 11/2018 |

\* cited by examiner

VEHICLE, UPPER UNIT, AND CONTROL DEVICE

CROSS REFERENCE TO THE RELATED APPLICATION

This application claims the benefit of Japanese Patent Application No. 2019-210658, filed on Nov. 21, 2019, which is hereby incorporated by reference herein in its entirety.

BACKGROUND

Technical Field

The present disclosure relates to a vehicle, an upper unit, and a control device.

Description of the Related Art

Japanese Patent Laid-Open No. 2018-176798 describes a multi-purpose platform in which an entire upper surface of a vehicle body frame is exposed to the outside to support various types of work units. With this configuration, the multi-purpose platform has increased versatility and can implement a vehicle that, e.g., provides transportation, provides security, performs monitoring, or performs a disaster investigation.

CITATION LIST

Patent Literature

Patent Literature 1: Japanese patent application laid-open publication No. 2018-176798

SUMMARY

An object of the present disclosure is to provide a technique for allowing loading of a plurality of upper units having space to store a person or an object on an under unit including a drive mechanism that rotates wheels in a vehicle.

A vehicle according to one aspect of the present disclosure may includes an under unit including a drive mechanism that rotates wheels, wherein the under unit includes a loading unit, on which at least one of a plurality of upper units can be loaded, and the at least one of the plurality of upper units loaded on the under unit and having space to store a person or an object, and each of the plurality of upper units includes a joint that joins to a different upper unit that is adjacently loaded.

An upper unit according to one aspect of the present disclosure may be an upper unit that constitutes a vehicle by being loaded on an under unit including a drive mechanism that rotates wheels, including a housing having space to store a person or an object, and a joint provided on an outer surface of the housing and configured to, if a plurality of the upper units is loaded adjacent to a different upper unit on a loading unit of the under unit, joins the housing to a housing of the different upper unit.

A control device according to one aspect of the present disclosure may be a control device for a vehicle including at least one of a plurality of upper units having space to store a person or an object and an under unit including a loading unit, on which the at least one of the plurality of upper units can be loaded, and a drive mechanism that rotates wheels, including a processing unit provided in the under unit and configured to execute determining whether the at least one of the plurality of upper units is loaded on the under unit, and causing a joint of the at least one of the plurality of upper units to operate and join the at least one of the plurality of upper units to a different one of upper units which is adjacently loaded on the loading unit, if the at least one of the plurality of upper units is determined to be loaded.

According to the present disclosure, it is possible to provide a technique for allowing attachment of a plurality of upper units to an under unit.

DESCRIPTION OF THE EMBODIMENTS

Figure 1:
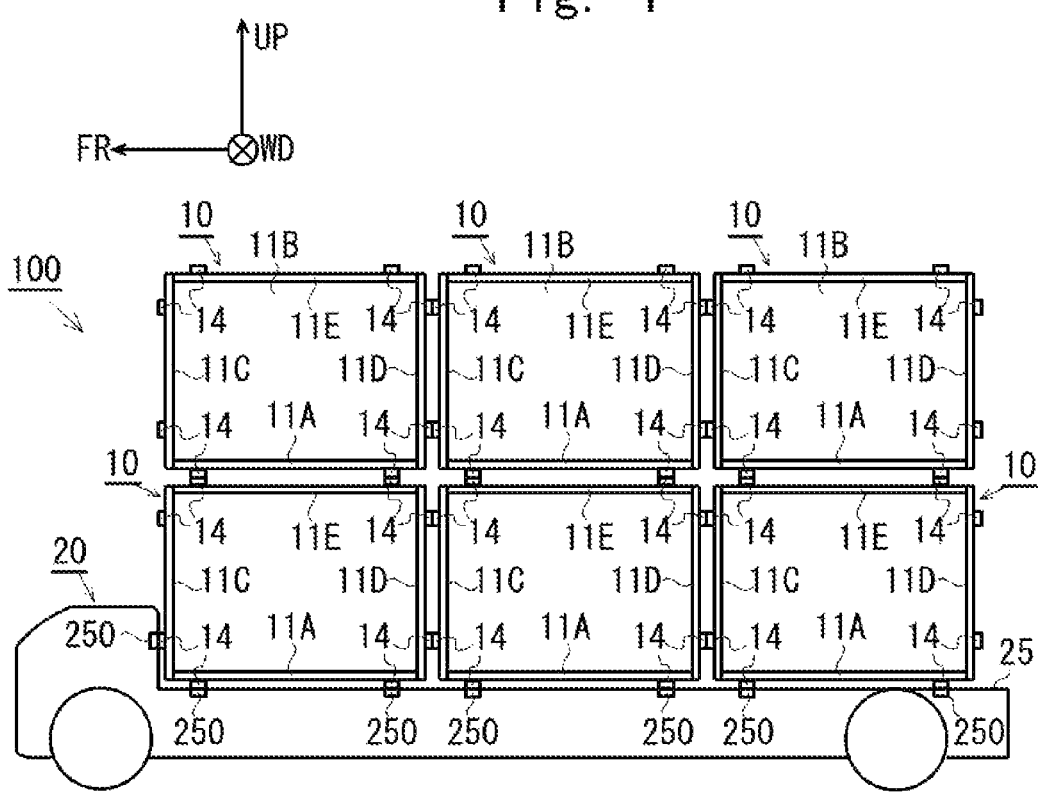
FIG. 1 is a side view of a vehicle according to an embodiment.

One of aspects of the present disclosure may be a vehicle including an under unit including a drive mechanism that rotates wheels, wherein the under unit includes a loading unit, on which at least one of a plurality of upper units can be loaded, and the at least one of the plurality of upper units loaded on the under unit and having space to store a person or an object (baggage), wherein each of the upper units includes a joint that joins to a different upper unit that is adjacently loaded.

The vehicle may be, for example, an automobile that runs on a road while carrying a person or baggage. The vehicle is not limited to this and may be a railroad vehicle that runs on a railroad track or a streetcar that runs on a track.

With the above-described configuration, the vehicle according to the present disclosure can collectively convey a plurality of upper units and can improve conveyance efficiency or energy efficiency. Additionally, a user can move comfortably over a long distance while using a privately owned upper unit.

In the vehicle according to the present disclosure, the plurality of upper units can be loaded on the loading unit in a state of being lined up in at least a vehicle width direction or a height direction of the vehicle. This increases a density of upper units to be loaded on a vehicle that runs along one lane and allows improvement of the conveyance efficiency.

In the vehicle according to the present disclosure, if one of the plurality of upper units is loaded adjacent to a different upper unit on a loading surface of the under unit, at least one of a plurality of the joints that joins to a connector at the loading surface may be provided at a position at a predetermined distance from a reference point corresponding to a position where the one of the plurality of upper units contacts the different upper unit. This determines a position in the loading surface of the upper unit loaded on the loading surface and allows the upper unit and the different upper unit to be joined at a predetermined position.

In the vehicle according to the present disclosure, if one of the plurality of upper units is loaded on a loading surface of the under unit, the joint may be provided at a position at a predetermined height from the loading surface. As for the joint, a position in a width direction, a shape, or the like may be determined in advance, in addition to the height from the loading surface. This determines at least a level of the joint with no exception and facilitates joining of unspecified upper units.

In the vehicle according to the present disclosure, the at least one of the plurality of upper units may be electrically connected to a different upper unit via the joint. This allows supply of power from one upper unit to the other upper unit. That is, power can be interchanged between upper units. Note that the upper unit may include a solar battery panel and supply power that is generated through reception of sunlight to the different upper unit.

In the vehicle according to the present disclosure, the under unit may include a connector that is electrically connected to the at least one of the plurality of upper units, and the at least one of the plurality of upper units may include a power supplier that supplies power to the under unit via the connector. The power supplier may include a battery. This allows giving of power from the upper unit to the under unit. Note that the upper unit may include a solar battery panel and supply power generated through reception of sunlight to the under unit.

In the vehicle according to the present disclosure, the under unit may include a connector that is electrically connected to the at least one of the plurality of upper units, and the under unit may include a power supplier that supplies power to the at least one of the plurality of upper units via the connector. The power supplier may include a battery. This allows giving of power from the under unit to the upper unit.

In the vehicle according to the present disclosure, each of the plurality of upper units may include a housing that forms the space and an interior component that is provided in the housing. This allows loading of a plurality of upper units including interior components on the under unit.

An upper unit according to the present disclosure may constitute a vehicle by being loaded on an under unit including a drive mechanism that rotates wheels and includes a housing having space to store a person or an object, and a joint provided on an outer surface of the housing and configured to, if a plurality of the upper units is loaded adjacent to a different upper unit on a loading unit of the under unit, joins the housing to a housing of the different upper unit. With this configuration, a plurality of upper units according to the present disclosure can be loaded on one under unit and can be collectively conveyed. This allows improvement of conveyance efficiency or energy efficiency. Additionally, a user can use a public under unit while getting on a privately owned upper unit.

The upper unit according to the present disclosure may be loaded adjacent to a different upper unit in at least a vehicle width direction or a height direction of the vehicle. This increases a density of upper units to be loaded on a vehicle that runs along one lane and allows improvement of the conveyance efficiency.

In the upper unit according to the present disclosure, if the upper unit is loaded adjacent to a different upper unit on a loading surface of the under unit, at least one of a plurality of the joints that joins to a connector of the loading surface may be provided at a position at a predetermined distance from a reference point corresponding to a position where the upper unit contacts the different upper unit. This pinpoints a position in a horizontal plane of the upper unit loaded on the loading surface and allows the upper unit and the different upper unit to be joined at a predetermined position.

In the upper unit according to the present disclosure, if the upper unit is loaded on a loading surface of the under unit, the joint may be provided at a position at a predetermined height from the loading surface. This determines at least a level of the joint with no exception and facilitates joining of unspecified upper units.

The upper unit according to the present disclosure may be electrically connected to a different upper unit via the joint. This allows interchange of power with the different upper unit.

In the upper unit according to the present disclosure, the under unit may include a connector that is electrically connected to the upper unit, and the upper unit may include a power supplier that supplies power to the under unit via the connector. The power supplier may include a battery. With this configuration, the upper unit can give power to the under unit.

The under unit includes a connector that is electrically connected to the upper unit, the upper unit according to the present disclosure may include a power acceptor that receives power supply from the under unit via the connector. With this configuration, the upper unit can receive power from the under unit.

A control device according to the present disclosure may be a control device for a vehicle including at least one of a plurality of upper units having space to store a person or an object and an under unit including a loading unit, on which the at least one of the plurality of upper units can be loaded, and a drive mechanism that rotates wheels, including a processing unit provided in the under unit and configured to execute determining whether the at least one of the plurality of upper units is loaded on the under unit, and causing a joint of the at least one of the plurality of upper units to operate and join the at least one of the plurality of upper units to a different one of upper units which is adjacently loaded on the loading unit, if the at least one of the plurality of upper units is determined to be loaded. As described above, the control device according to the present disclosure may be configured such that at least one of a plurality of upper units loaded on the under unit is joined together, which allows loading of at least one of a plurality of upper units on one under unit. With this configuration, at least one of plurality of upper units can be collectively conveyed, and conveyance efficiency or energy efficiency can be improved.

If the at least one of the plurality of upper units and the different upper unit are electrically connected via the joint, the control device according to the present disclosure may acquire an amount of power that flows between the at least one of the plurality of upper units and the different upper unit via the joint and calculate a fee for using the power on the basis of the amount of the power. This allows payment of a fee commensurate with an amount of power used or reception of a fee commensurate with an amount of power supplied.

If the at least one of the plurality of upper units and the under unit are electrically connected via a connector, the control device according to the present disclosure may acquire an amount of power that flows between the at least one of the plurality of upper units and the under unit via the connector, obtain a running distance, over which the under unit runs with the at least one of the plurality of upper units loaded on the under unit, and calculate a fee for using the under unit on the basis of the amount of the power and the running distance. This makes it possible to determine a fee for using the under unit in accordance with, e.g., presence or absence of power supply. A fee for using the under unit can be made inexpensive by, for example, preparing energy (power) for running on a side with the at least one of the plurality of upper units and supplying power from the at least one of the plurality of upper units to the under unit at the time of running.

Figure 2:
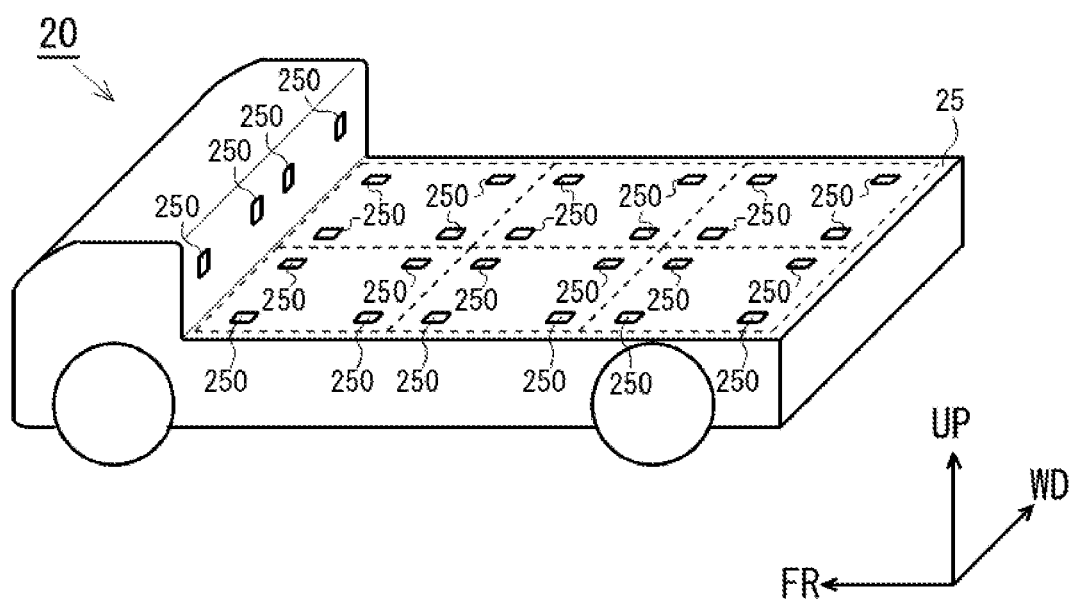
FIG. 2 is a perspective view of an under unit.
Figure 3:
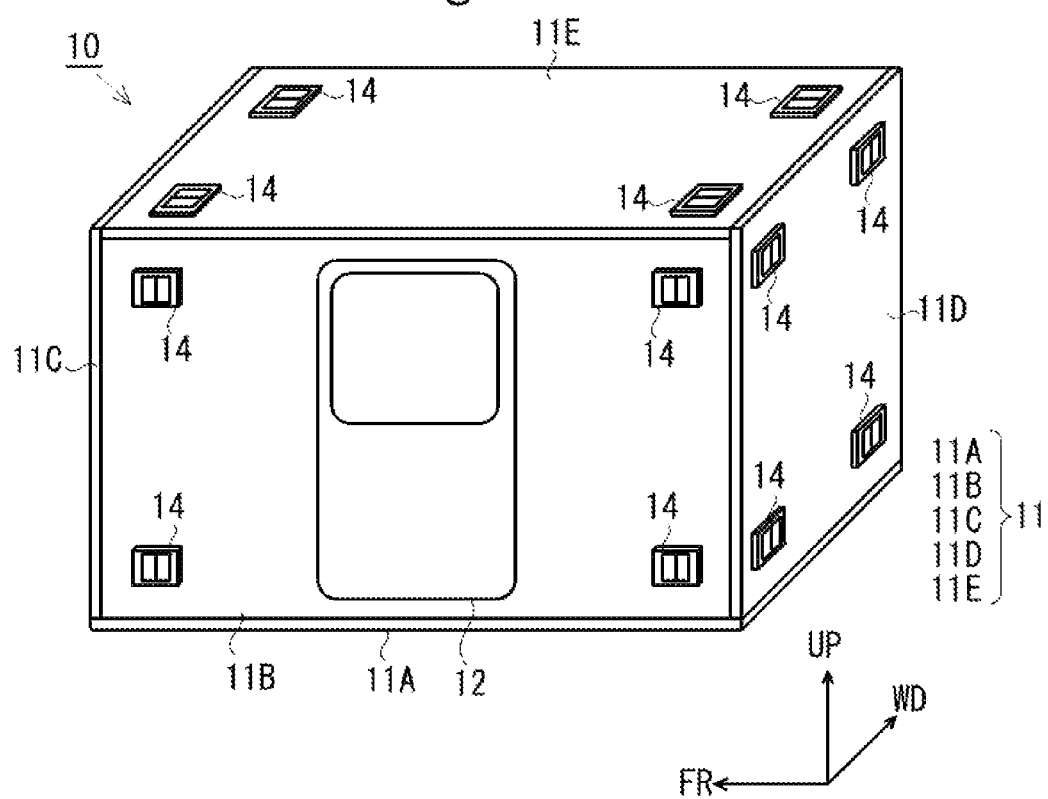
FIG. 3 is a perspective view of an upper unit.
Figure 4:
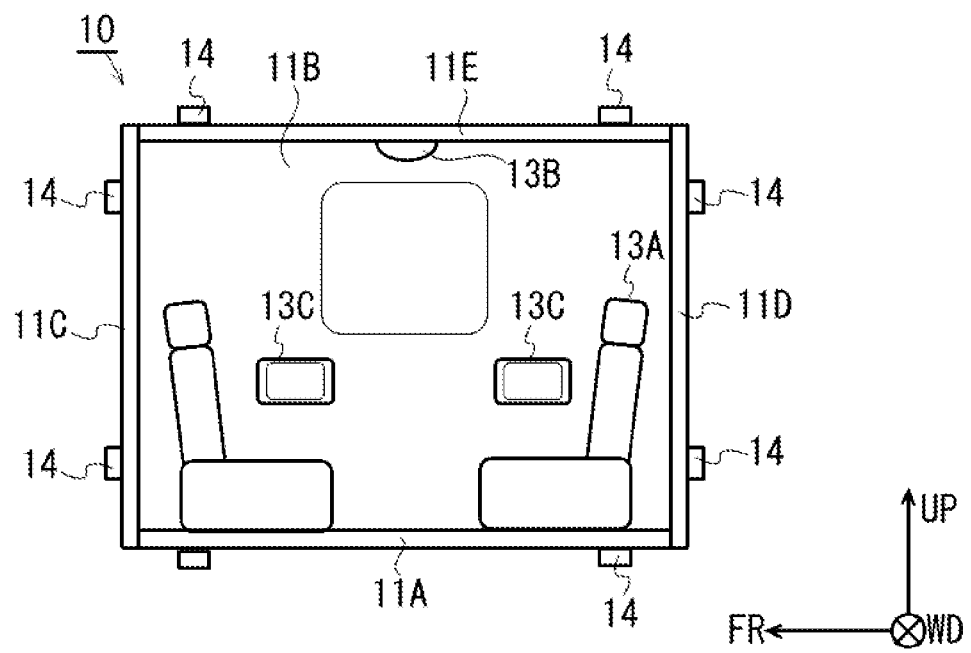
FIG. 4 is a schematic configuration view of the upper unit.
Figure 5:
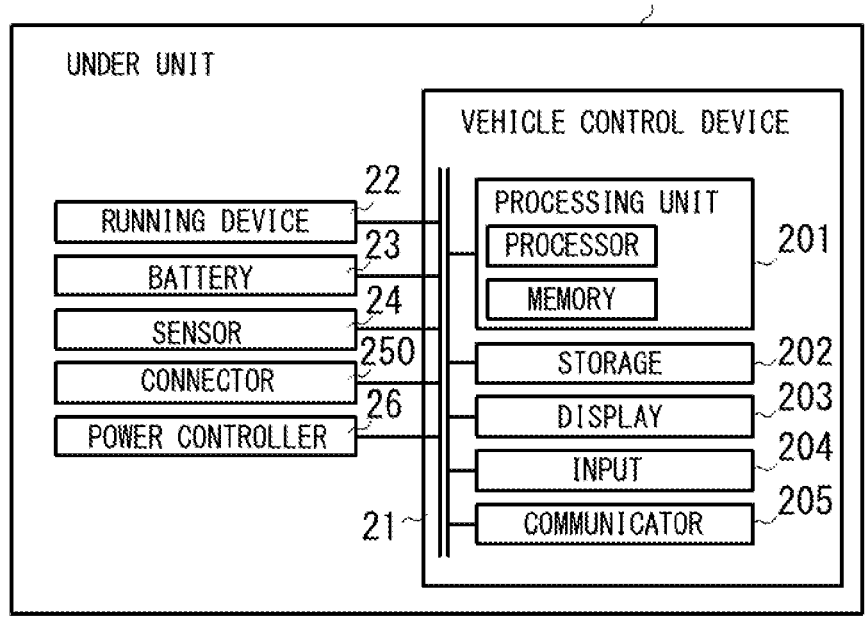
FIG. 5 is a diagram illustrating a configuration of a vehicle control device that is provided in the under unit.
Figure 6:
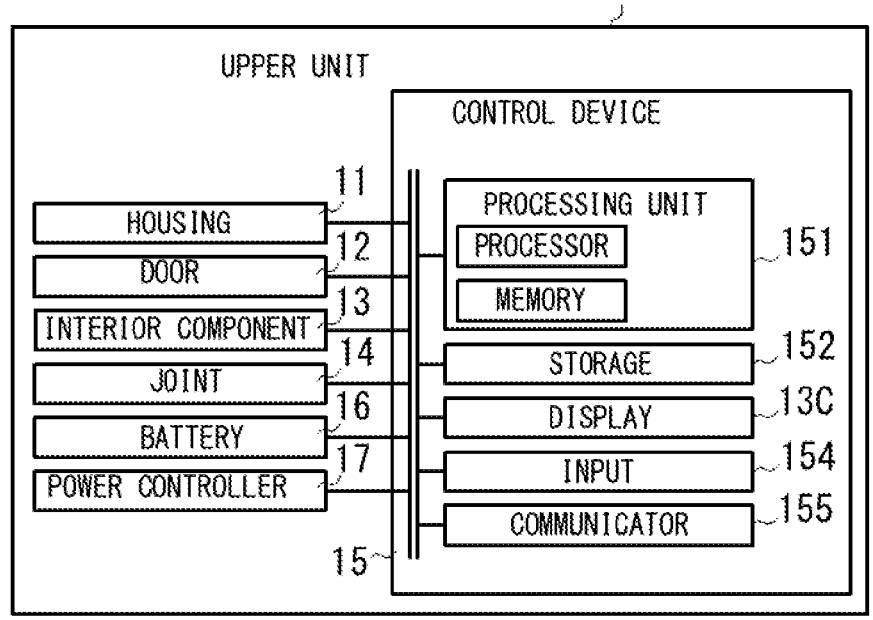
FIG. 6 is a diagram illustrating a configuration of a control device that is provided in the upper unit.

A configuration of a vehicle 100 will be described below with reference to the drawings. FIG. 1 is a side view of the vehicle 100 according to the present embodiment, FIG. 2 is a perspective view of an under unit 20, FIG. 3 is a perspective view of an upper unit 10, and FIG. 4 is a schematic configuration view of the upper unit 10. FIG. 5 is a diagram illustrating a configuration of the under unit 20, and FIG. 6 is a diagram illustrating a configuration of the upper unit 10. Note that an arrow FR appropriately illustrated in the drawings indicates a front direction of a vehicle front-back direction, an arrow UP indicates an up direction of a vehicle up-down direction, and an arrow WD indicates a vehicle width direction.

The vehicle 100 disclosed in the present embodiment includes the under unit 20 that includes a drive mechanism that rotates wheels and the upper unit 10 that is loaded on the under unit 20 and is a vertically separable vehicle in which the under unit 20 and the upper unit 10 are separable from each other. In the vehicle 100, a plurality of upper units 10 can be loaded on the one under unit 20. Among others, a plurality of upper units 10 can be loaded in at least the vehicle width direction or a height direction in the vehicle 100 according to the present embodiment. For example, in the example of FIG. 1, the upper units 10 are loaded in two tiers in the height direction.

As illustrated in FIG. 5, the under unit 20 includes, in a housing, a vehicle control device 21, a running device 22, a battery 23, a sensor 24, and a power controller 26, and an upper surface of the housing is made to serve as a loading unit 25. A plurality of connectors 250, to which the upper units 10 are connected, is provided at the loading unit 25. For example, four connectors 250 connect with one upper unit 10. A plurality of sets of connectors 250, each of which is composed of four connectors 250, is provided at the loading unit 25.

The running device 22 is a mechanism that runs the vehicle 100 and has a power source, such as an internal combustion engine or a motor, a power generator, a transfer mechanism, a braking mechanism, a steering mechanism, and the like.

Examples of the transfer mechanism include a transmission that changes drive force generated by a power source in torque, RPM, and rotation direction and transfers the drive force to the wheels. Note that a configuration in which wheels are directly driven by a power source without use of a transfer mechanism may be adopted, as in a wheel-in motor.

The battery 23 supplies power to units, such as the vehicle control device 21, the running device 22, and the upper unit 10, of the vehicle 100. Various types of batteries, such as a battery that stores power generated by the power generator of the running device 22, a battery that stores power when connected to an external commercial power source, or a fuel battery that generates power using a fuel (e.g., hydrogen), can be adopted as the battery 23.

The sensor 24 is a speed sensor, an acceleration sensor, an orientation sensor, a rainfall sensor, a temperature sensor, an obstacle sensor, or the like and detects at least one of a state of the vehicle and a state of surroundings. The obstacle sensor may be a camera, a radar, a LiDAR (Laser Imaging Detection and Ranging), or the like.

The power controller 26 is a controller that controls charging of the battery 23 or discharging of the battery 23. The power controller 26 may be a converter that converts, e.g., a voltage value of power at the time of charging and discharging of the battery 23.

The vehicle control device 21 controls units, such as the running device 22, of the under unit 20. Alternatively, the vehicle control device 21 may control the upper unit 10 that is mounted on the under unit 20. The vehicle control device 21 is a computer that is mounted in the under unit 20 and includes a processing unit 201, a storage 202, a display 203, an input 204, and a communicator 205.

The processing unit 201 controls overall operation of the vehicle control device 21 and implements various types of functions of the vehicle control device 21. The processing unit 201 includes, for example, a processor and a memory. The processor controls operation of the vehicle control device 21 in a centralized manner. The processor is also called a CPU, an MPU, or the like. The memory is, for example, a ROM and a RAM. The ROM is a storage medium that stores various types of programs or data. The RAM is a storage medium that temporarily stores various types of programs or data. The RAM may be configured to be directly accessible from the processor and function as a main memory. The processor executes programs stored in the ROM, the storage 202, and the like, using the RAM as a work area (work region). Through the execution of the programs, the processing unit 201 processes information that is acquired via the sensor 24 or the input 204 and executes control that causes the car to run autonomously toward a destination. The processing unit 201 calculates a route from a current place to the destination, and automated driving is done along the route, for example, if the processing unit 201 receives information on the destination from a terminal of a manager or the control device 15 of the upper unit 10.

The storage 202 is a memory device, such as an HDD or an SSD. The storage 202 functions as an external memory device for the processing unit 201. The storage 202 stores map information, correspondence information, information on settings made by a user, or the like. The display 203 is means that displays information and is, for example, a liquid crystal display device, an organic EL display device, or the like. The display 203 may be a display device that is provided in a car and provides a display to a passenger in the car or an external display device that is provided outside a car and provides a display to a person outside the car.

The input 204 is means that accepts a user operation and is, for example, a button, a touch panel, or the like. The communicator 205 is a communication interface for communication with an external device. The communicator 205 may include a plurality of communication interfaces, such as a communication interface that performs direct communication with a different vehicle as well as a communication interface that performs communication over a communication network N. Communication interfaces that perform direct communication with a different vehicle include a communication interface that performs communication using Bluetooth®, ZigBee®, or ad-hoc mode of Wi-Fi®. Alternatively, a communication interface that performs communication using service radio (convenience radio) may be adopted.

The upper unit 10 includes a housing 11, a door 12, interior components 13, joints 14, a control device 15, a battery 16, and a power controller 17.

As illustrated in FIGS. 3 and 4, the housing 11 includes a floor panel 11A, side panels 11B, a front panel 11C, a rear panel 11D, and a roof panel 11E and constitutes an outer shell of the upper unit 10, and an interior thereof is made to serve as a compartment. That is, the housing 11 isolates the interior from an exterior through demarcation and forms space (compartment) to store a person or an object. The floor panel 11A, the side panels 11B, and the roof panel 11E each include the joints 14 on an outer surface.

In the side panel 11B, an opening as a doorway is provided, and a door 12 that opens and closes the opening is provided. Note that the number of doors 12 is not particularly limited. For example, a plurality of doors 12 may be provided in the side panel 11B, the front panel 11C, or the rear panel 11D, or the door 12 may be provided in any one of the side panel 11B, the front panel 11C, and the rear panel 11D. A window that is openable and closable may be further provided in the door 12.

The interior components 13 are provided in the interior of the housing 11, i.e., on inner side surfaces of the floor panel 11A, the side panels 11B, the front panel 11C, the rear panel 11D, and the roof panel 11E. Although seats 13A that are installed on the floor panel 11A, a luminaire 13B that is provided on a lower surface of the roof panel 11E, and displays 13C that are buried in the side panel 11B are illustrated as examples of the interior components 13 in FIG. 4, the interior components 13 are not limited to these. Examples of the interior component 13 include an audio instrument, a table, an air conditioner, an air conditioner vent, a speaker, cooking equipment, and a bed.

The power controller 17 is a controller that controls charging of the battery 16 or discharging of the battery 16. The power controller 17 may be a converter that converts, e.g., a voltage value of power at the time of charging and discharging of the battery 16.

The control device 15 is a computer that is mounted in the upper unit 10 and includes a processing unit 151, a storage 152, the display (display) 13C, an input 154, and a communicator 155.

The processing unit 151 controls overall operation of the control device 15 and implements various types of functions of the control device 15. For example, the processing unit 151 controls, e.g., joining to the different upper unit 10 by the joints 14 or unjoining. The processing unit 151 also controls power reception, power transmission, or the like by the power controller 17. The processing unit 151 includes, for example, a processor and a memory. The processor controls operation of the control device 15 in a centralized manner. The processor is also called a CPU, an MPU, or the like. The memory is, for example, a ROM and a RAM. The RCM is a storage medium that stores various types of programs or data. The RAM is a storage medium that temporarily stores various types of programs or data. The RAM may be configured to be directly accessible from the processor and function as a main memory.

The processor executes programs stored in the ROM, the storage 152, and the like, using the RAM as a work area (work region). Through the execution of the programs, the processing unit 151 implements functions, such as control of the joint 14 and control of the power controller 17. The processing unit 151 causes one of the joints 14 which is in contact with the joint 14 of the different upper unit 10 that is adjacently loaded to operate to join to the different upper unit 10, for example, if the processing unit 151 receives an instruction (a command) for joining from the vehicle control device 21 of the under unit 20. If settings for supply of power to the under unit 20 are made through a user operation, the processing unit 151 controls the power controller 17 to supply power discharged from the battery 16 to the under unit 20 when the upper unit 10 is loaded on the under unit 20. As described above, the power controller 17 and the battery 16 according to the present embodiment serve as a power supply unit. If settings for power reception are made through a user operation, the processing unit 151 controls the power controller 17 to receive power from the under unit 20 via the connectors 250 and supply the power to the interior components 13 or the battery 16 when the upper unit 10 is loaded on the under unit 20. As described above, the power controller 17 according to the present embodiment serves as a power acceptor.

The storage 152 is a memory device, such as an HDD or an SSD. The storage 152 functions as an external memory device for the processing unit 151. The storage 152 stores map information, correspondence information, information on settings made by a user, and the like. The display 13C is means that displays information and is, for example, a liquid crystal display device, an organic EL display device, or the like. The display 13C in the present example is provided in an interior of a room in the upper unit 10 and provides a display to a passenger in the interior of the room. Alternatively, a plurality of displays may be provided. Alternatively, an external display device that is provided outside the vehicle and provides a display to a person outside the vehicle may be adopted as a display.

The input 154 is means that accepts a user operation and is, for example, a button, a touch panel, or the like. In the present example, the display 13C includes a touch panel as the input 154 and receives an input from a passenger. The communicator 155 is a communication interface for communication with an external device. The communicator 155 may include a plurality of communication interfaces, such as a communication interface that performs direct communication with a different vehicle as well as a communication interface that performs communication over the communication network N. Communication interfaces that perform direct communication with a different vehicle include a communication interface that performs communication using Bluetooth®, ZigBee®, or ad-hoc mode of Wi-Fi®. Alternatively, a communication interface that performs communication using service radio (convenience radio) may be adopted.

Figure 7:
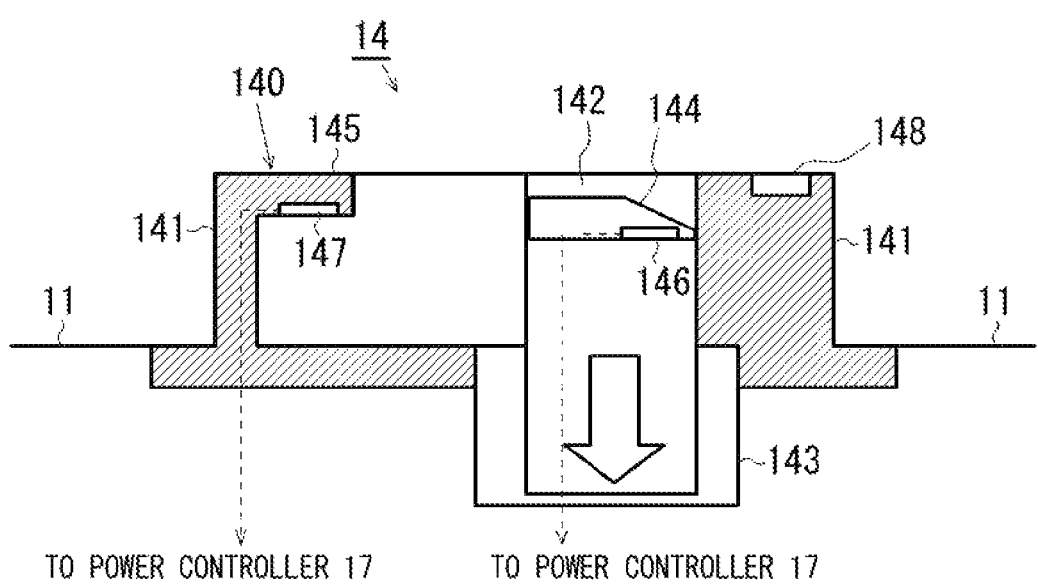
FIG. 7 is a schematic cross-sectional view of a joint.

FIG. 7 is a schematic cross-sectional view of the joint 14. The joint 14 is provided on an outer surface side of the housing 11, and at least a part of the joint 14 is exposed for joining to the different joint 14 or the connector 250 of the under unit 20. Note that since the joint 14 of the upper unit 10 and the connector 250 of the under unit 20 have the same structures in the present embodiment, the structure of the joint 14 will be described below, and a description of the structure of the connector 250 will be omitted. Although the joint 14 in FIG. 7 is provided to protrude from an outer surface of the housing 11, an outer surface of the joint 14, i.e., a surface (joined surface) 140 to come into contact with the different joint 14 may be provided to be even with the outer surface of the housing 11.

The joint 14 has a frame body 141, a joining rod 142, and an actuator 143. The joining rod 142 is advanced or retreated by the actuator 143, and is retreated and housed in the frame body 141 in a state (a non-joined state) of being not joined to the different joint 14.

Figure 8:
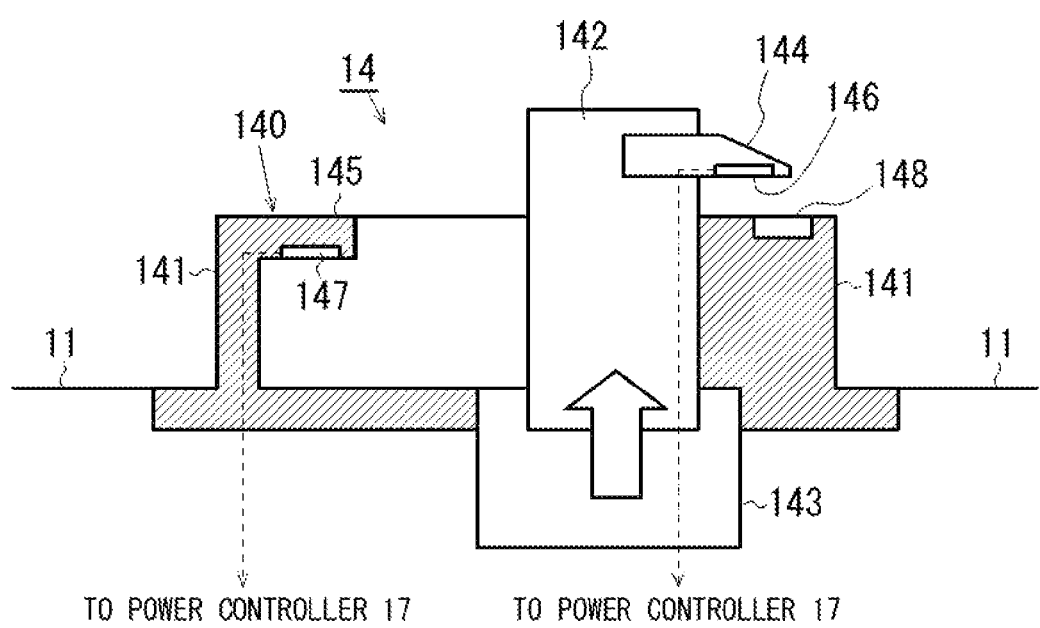
FIG. 8 is a schematic cross-sectional view illustrating one of joints in a joined state.
Figure 9:
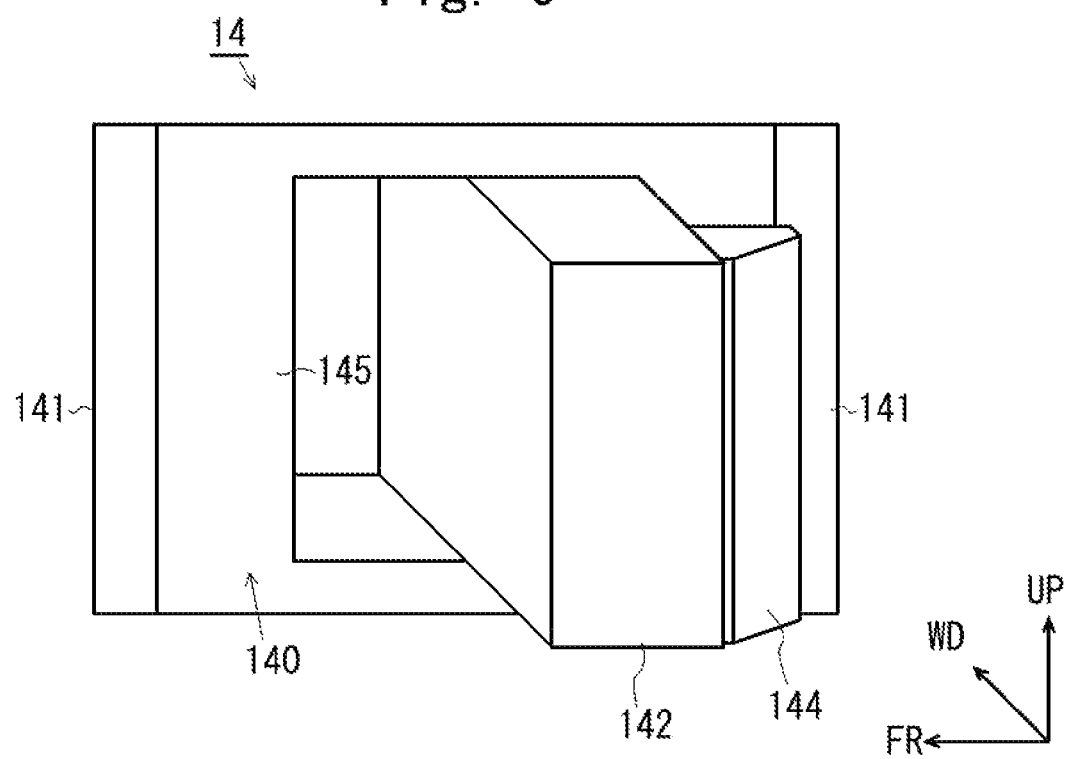
FIG. 9 is a schematic perspective view illustrating the one of the joints in the joined state.
Figure 10:
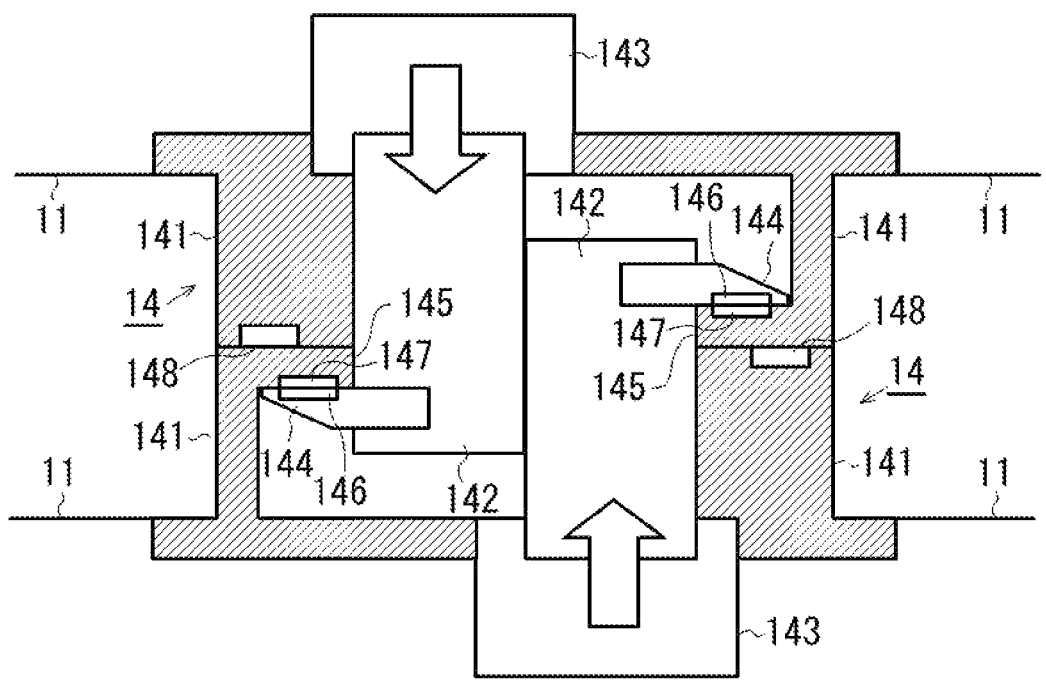
FIG. 10 is a schematic cross-sectional view illustrating a state in which one of joints and a different joint are joined together.

The joining rod 142 is advanced by the actuator 143 at the time of joining to the different joint 14, and an outer end unit is protruded from the frame body 141. FIG. 8 is a schematic cross-sectional view illustrating one of the joints 14 in a joined state, FIG. 9 is a schematic perspective view illustrating the one of the joints 14 in the joined state, and FIG. 10 is a schematic cross-sectional view illustrating a state in which one of the joints 14 and the different joint 14 are joined together.

As illustrated in FIG. 8, when the joining rod 142 advances from the frame body 141 at the time of joining, an engagement lug unit 144 is protruded in a direction orthogonal to a direction of advancement and retreatment from a side surface near the outer end unit. When the engagement lug unit 144 protrudes, the engagement lug unit 144 comes into engagement with an engagement piece 145 that is provided at the frame body 141 of the different joint 14, as illustrated in FIG. 10. With this engagement, the joint 14 and the different joint 14 engage together. Note that a configuration in which the actuator 143 draws the joining rod 142 inward and draws the engagement piece 145 of the different joint 14 closer at the time of joining to bring the joined surfaces 140 of the joint 14 and the different joint 14 into pressure contact with each other and prevent shakes and generation of abnormal noise at the time of joining may be adopted.

An inner side surface 144A of the engagement lug unit 144 includes a power terminal 146 that transmits and receives power. An inner side surface 145A of the engagement piece 145 to be engaged with the engagement lug unit 144 of the different joint 14 includes a power terminal 147 that is to connect with the power terminal 146 of the engagement lug unit 144. The power terminals 146 and 147 are electrically connected to each power controller 17. With this configuration, the upper unit 10 is capable of supplying power to the different upper unit 10 or receiving power from the different upper unit 10 at the time of joining to the different upper unit 10. Similarly, if the upper unit 10 is joined to the under unit 20 via the joints 14, the upper unit 10 is capable of supplying power to the under unit 20 or receiving power from the under unit 20. Note that the power terminals 146 and 147 that are provided at a plurality of joints 14 may be used by the power controller 17 as respective separate electrical circuits for the joints 14. For example, the power terminals 146 and 147 of one joint 14 may be used to supply power to the under unit 20, and the power terminals 146 and 147 of the different joint 14 may be used to relay power supplied from the under unit 20 to the different upper unit 10.

A sensor 148 is provided at the joined surface 140 of the frame body 141. The sensor 148 detects contact with the joint 14 of the different upper unit 10, i.e., that the different upper unit 10 is adjacently arranged and is joinable.

The joint 14 may include a communication connector that connects with the different joint 14 or the connector 250 at the time of joining to the joining partner 14 or 250.

Figure 11:
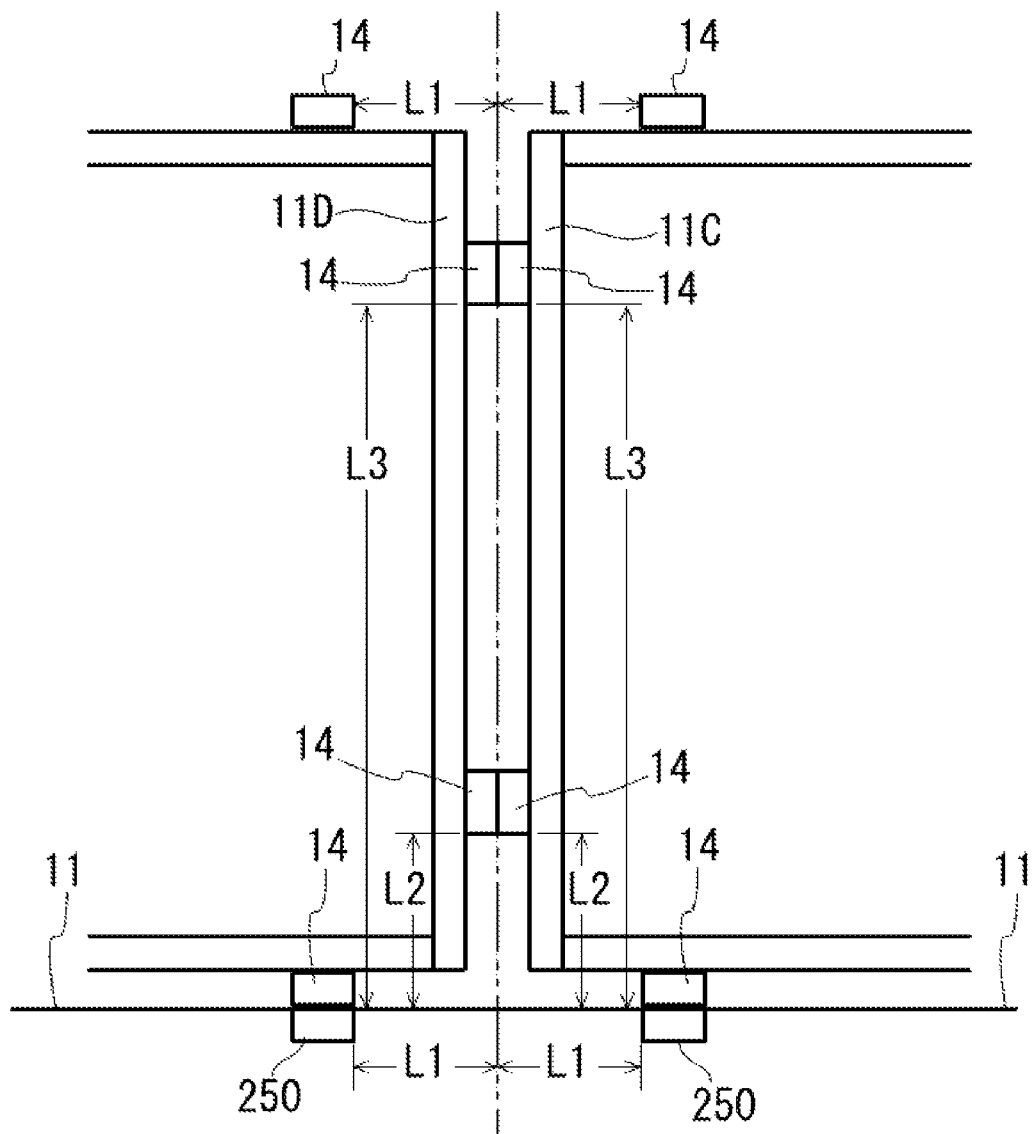
FIG. 11 is a view illustrating arrangement of joints.

FIG. 11 is a view illustrating arrangement of the joints 14. In the example of FIG. 11, the upper unit 10 is loaded on a loading surface of the horizontal loading unit 25 adjacent to the different upper unit 10. In this case, the upper unit 10 includes the joint 14 that joins to the connector 250 at a position at a predetermined distance L1 from a reference point, which is set at a position (boundary) 91 adjacent to the different upper unit 10, in a horizontal direction. Similarly, the connector 250 of the under unit 20 is provided at a position at the predetermined distance L1 from the position 91 of the upper unit 10 that is adjacently arranged.

Additionally, the joint 14 that is provided at each of side surfaces (the side panels 11B, the front panel 11C, and the rear panel 11D) of the upper unit 10 is provided at a predetermined height from a loading surface 25A of the under unit 20, which is a surface where the joint 14 is to be joined to the connector 250 in the present example. For example, the joints 14 in the present example are provided at two sites in the height direction of the side surface of the upper unit 10, the lower joint 14 is provided at a position at a height L2 from the loading surface 25A, and the upper joint 14 is provided at a position at a height L3 from the loading surface 25A. As described above, since positional relationships between the joints 14 and the joined surface (the loading surface) are determined with no exception in each upper unit 10, even if the upper unit 10 is arranged adjacent to the unspecified upper unit 10, the upper unit 10 can join to the different upper unit 10.

Figure 12:
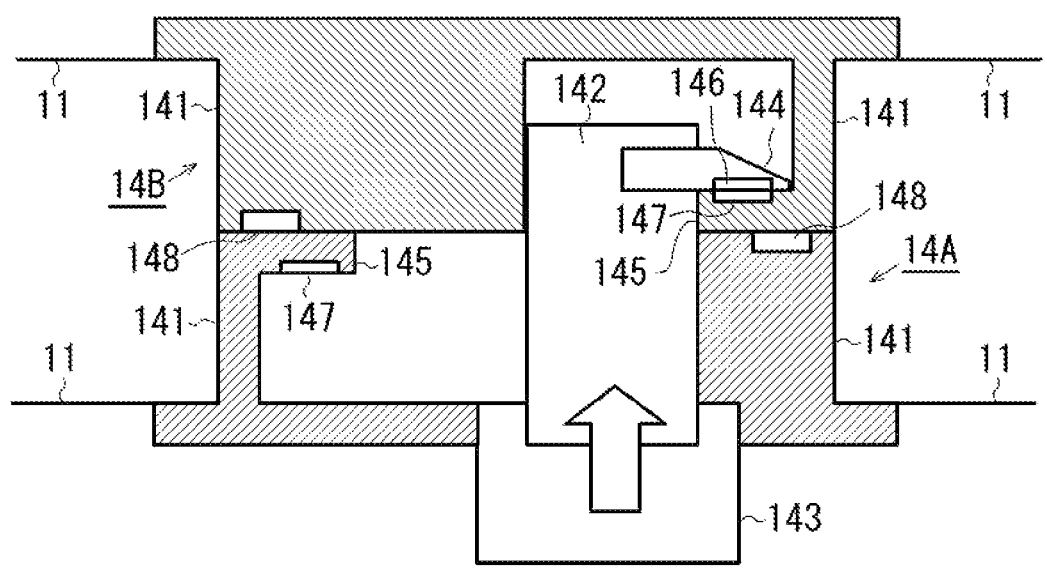
FIG. 12 is a view illustrating a modification of the joint.

Note that although an example in which the joints 14 with the same configurations are joined together is illustrated in the example of FIG. 10, a joint (hereinafter also referred to as an active joint) 14A that includes the joining rod 142 as described earlier may be used only as the joint 14 on one side, as illustrated in FIG. 12. In this case, a joint (hereinafter also referred to as a passive joint) 14B on the other side has a configuration in which the joining rod 142 and the actuator 143 are omitted. As described above, the active joint 14A may be provided on one of opposing surfaces of the upper unit 10, and the passive joint 14B may be provided on the other surface. For example, the active joint 14A may be provided on a left side surface of the upper unit 10, and the passive joint 14B may be provided on a right side surface of the upper unit 10. Alternatively, the active joint 14A may be provided on a lower surface of the upper unit 10, the passive joint 14B may be provided on an upper surface of the upper unit 10, and a passive connector having the same configuration as that of the passive joint 14B may be provided on the loading surface of the under unit 20.

Figure 13:
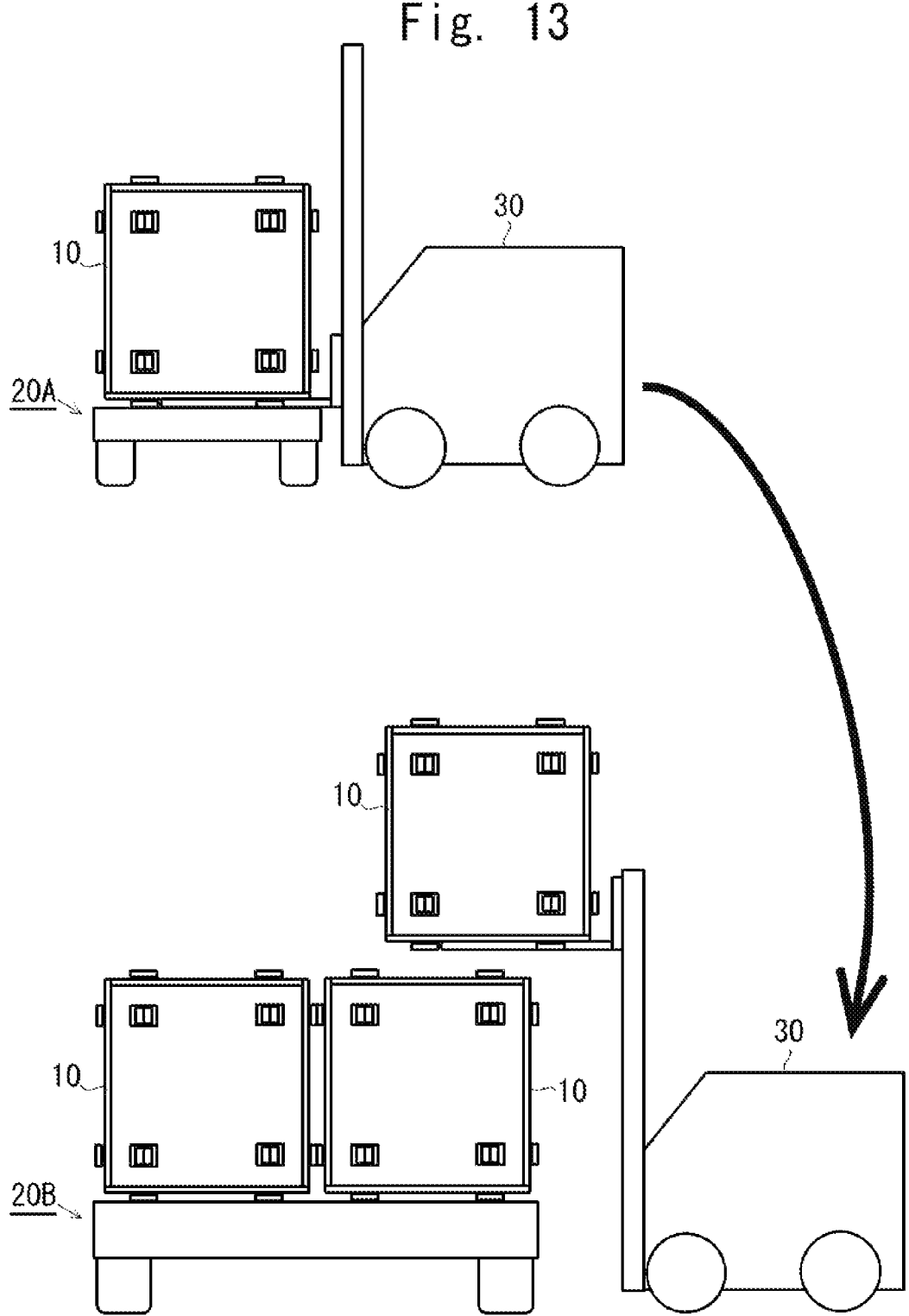
FIG. 13 is a view illustrating an example in which an upper unit is loaded onto or unloaded from an under unit.

FIG. 13 is a view illustrating an example in which the upper unit 10 is loaded onto and unloaded from the under unit 20. In FIG. 13, an under unit 20A is the small-sized under unit 20, and an under unit 20B is the large-sized under unit 20, on which a plurality of upper units 10 can be loaded, as in a bus or a train. Note that the under unit 20A may be configured to include the connectors 250, to which at least one upper unit 10 can be joined, and may be one on which a plurality of upper units 10 cannot be loaded.

A user moves to a point of departure of the under unit 20B, for example, in a state in which the upper unit 10 is loaded on the privately owned under unit 20A and transmits a pick-up request from the control device 15 of the upper unit 10 to the vehicle control device 21 of the under unit 20B.

When the vehicle control device 21 receives the pick-up request, the vehicle control device 21 instructs a forklift 30 to load the upper unit 10. Upon receipt of the instruction, the forklift 30 lifts up the upper unit 10 loaded on the under unit 20A and moves the upper unit 10 to a stop position of the under unit 20B, and loads the upper unit 10 such that a position of each joint 14 coincides with a position of the connector 250 of the loading unit 25. When the upper unit 10 is to be loaded on the different upper unit 10, the upper unit 10 is loaded such that the joints 14 coincide with each other. The loaded upper unit 10 is fixed to the under unit 20 by being joined to the connector 250 of the under unit 20 or the joint 14 of the different upper unit 10 and is conveyed to a destination together with the different upper unit 10. The upper unit 10 may change to the different under unit 20A or 20B at the destination and move further.

The upper unit 10 that has returned from the destination to the place of departure while being loaded on the under unit 20B is moved from the under unit 20B to the under unit 20A by the forklift 30 by a procedure reverse to that at the time of loading.

Note that although the upper unit 10 is loaded and unloaded by the forklift 30 in the example of FIG. 13, the present disclosure is not limited to this, and the upper unit 10 may be loaded and unloaded by a crane or the like.

Figure 14:
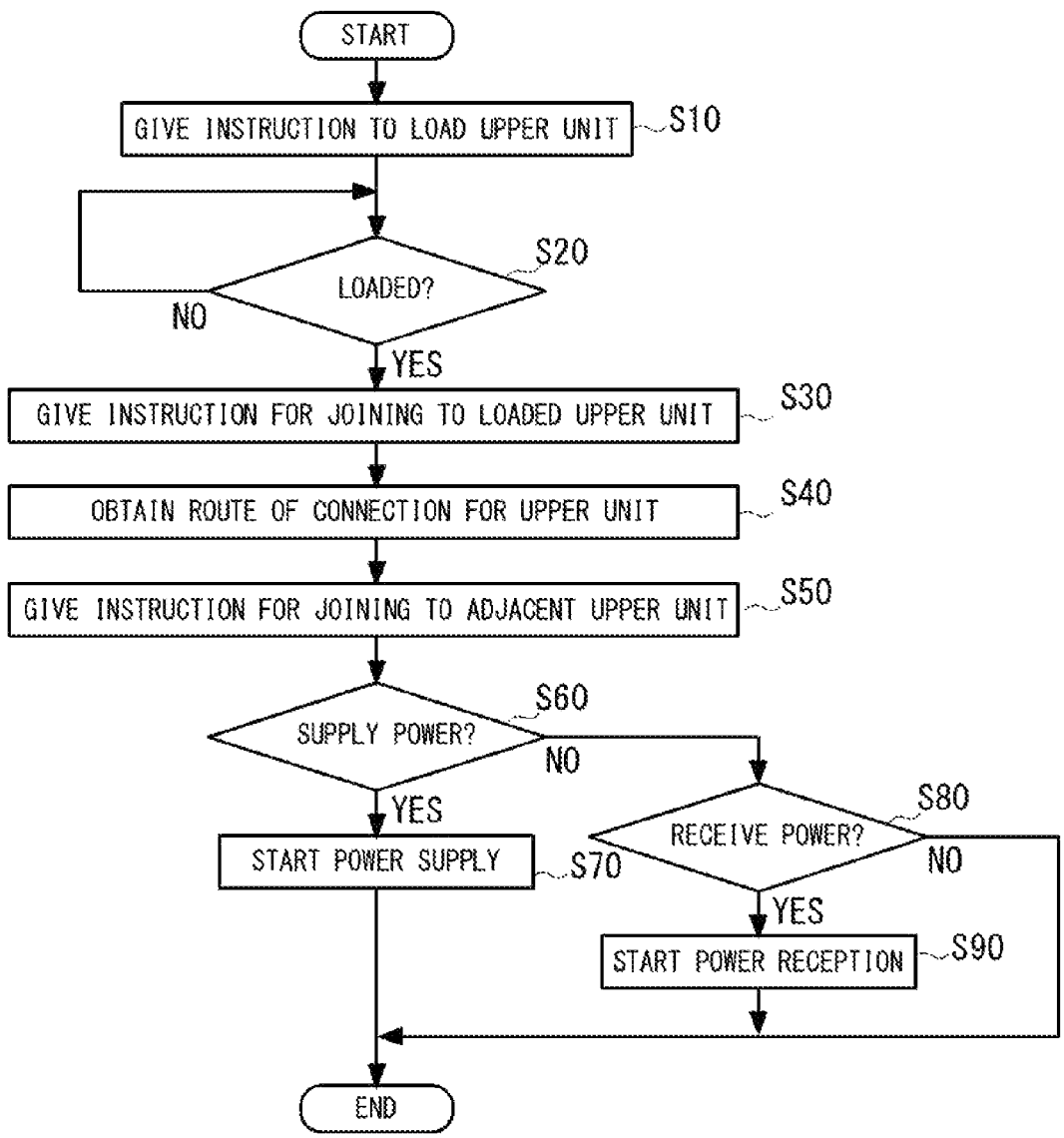
FIG. 14 is a chart illustrating a control method to be executed by the vehicle control device of the under unit at the time of loading the upper unit onto the under unit.

FIG. 14 is a chart illustrating a control method to be executed by the vehicle control device 21 of the under unit 20B at the time of loading the upper unit 10 onto the under unit 20B. The vehicle control device 21 is capable of wireless communication with the control device 15 of the upper unit 10 via the communicator 205, and starts the process in FIG. 14 when the vehicle control device 21 receives a pick-up request from the control device 15. Note that the pick-up request is, for example, information indicating identification information, a destination, a point of drop-off, presence or absence of power supply, and the like of the upper unit 10 requesting to be loaded.

In step S10, the vehicle control device 21 transmits identification information of the upper unit 10 to the forklift 30 on the basis of a pick-up request and gives an instruction to load the upper unit 10 that is identified by the identification information. Note that the forklift 30 illustrated in FIG. 13 is an automated driving vehicle that pinpoints the upper unit 10 in accordance with the loading instruction and autonomously moves the upper unit 10 to the designated under unit 20. The forklift 30 is not limited to an automated driving vehicle and may be a vehicle that presents a received instruction to an operator and moves the upper unit 10 through driving by the operator. An instruction to load the upper unit 10 is not limited to the forklift 30 and may be given to different movement means, such as a crane.

In step S20, the vehicle control device 21 determines whether the upper unit 10 is loaded on the loading unit 25 by the forklift 30. The vehicle control device 21, for example, determines that the upper unit 10 is loaded (makes an affirmative determination) if a notification of loading is given from the forklift 30 and determines that the upper unit 10 is not loaded (makes a negative determination) if no notification is given. Note that the vehicle control device 21 may determine whether the upper unit 10 is loaded on the basis of whether a sensor provided in the connector 250 has detected contact with the joint 14, if the upper unit 10 is directly loaded on the loading unit 25.

The vehicle control device 21 periodically repeats determination and waits for a positive determination if a negative determination is made in step S20 and shifts to step S30 if a positive determination is made.

In step S30, the vehicle control device 21 gives an instruction for joining to the control device 15 of the loaded upper unit 10.

In step S40, the vehicle control device 21 communicates with the control device 15 of the upper unit 10 via the joints 14 that are joined in step S30 and pinpoints a route of connection with the upper unit 10. That is, the vehicle control device 21 recognizes, e.g., to which connectors 250 the upper unit 10 is connected and whether the different upper unit 10 intervenes between the vehicle control device 21 and the upper unit 10.

In step S50, if the joints 14 joined in step S30 are directly joined to the connectors 250, the vehicle control device 21 causes the connectors 250 to operate to be joined to the joints 14. If the joints 14 are in contact with the joints 14 of the different upper unit 10, the vehicle control device 21 gives an instruction for joining to the control device 15 of the different upper unit 10.

In step S60, the vehicle control device 21 determines, on the basis of the pick-up request received from the upper unit 10, whether to supply power.

If an affirmative determination is made in step S60, the vehicle control device 21 shifts to step S70 to give an instruction for power supply to the power controller 26 and start power supply via the route of connection pinpointed in step S40.

On the other hand, if a negative determination is made in step S60, the vehicle control device 21 shifts to step S80 to determine, on the basis of the pick-up request received from the upper unit 10, whether to receive power from the upper unit 10.

If an affirmative determination is made in step S80, the vehicle control device 21 shifts to step S90 to give an instruction for power reception from the upper unit 10 to the power controller 26, receive power via the route of connection pinpointed in step S40, and start charging of the battery 23 or power feeding to the motor.

Figure 15:
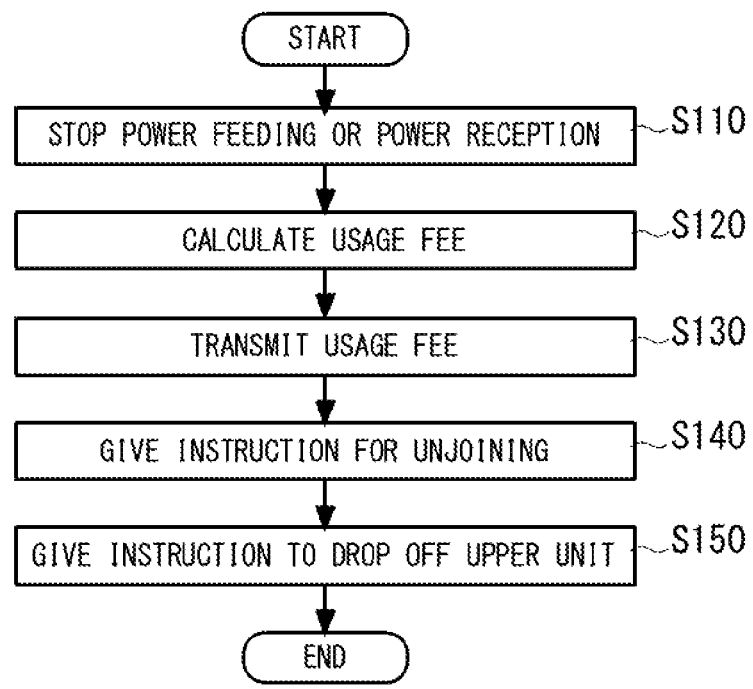
FIG. 15 is a chart illustrating a control method to be executed by the vehicle control device of the under unit at the time of unloading the upper unit from the under unit.

FIG. 15 is a chart illustrating a control method to be executed by the vehicle control device 21 of the under unit 20B at the time of unloading of the upper unit 10 from the under unit 20B. The vehicle control device 21 starts the process in FIG. 15 when the point of drop-off of the upper unit 10 is reached, on the basis of the pick-up request received from the upper unit 10.

In step S110, the vehicle control device 21 stops power feeding to the upper unit 10 to drop off or power reception from the upper unit 10 and obtains the amount of power fed to the upper unit 10 or the amount of power received from the upper unit 10.

In step S120, the vehicle control device 21 calculates a fee for using the under unit 20B from the amount of power received from the upper unit 10 and a running distance or the amount of power fed to the upper unit 10 and the running distance.

In step S130, the vehicle control device 21 transmits the fee for usage calculated in step S120 to the control device 15 of the upper unit 10.

In step S140, the vehicle control device 21 gives an instruction for unjoining to the control device 15 of the upper unit 10 to drop off. If the upper unit 10 to drop off is joined to the different upper unit 10, the vehicle control device 21 gives an instruction for unjoining to the control device 15 of the different upper unit 10. If the upper unit 10 to drop off is directly loaded on the loading unit 25, the vehicle control device 21 causes the connector 250 that is joined to the joint 14 of the upper unit 10 to operate to disconnect.

In step S150, the vehicle control device 21 transmits the identification information of the upper unit 10 to drop off to the forklift 30 and gives an instruction to drop off the upper unit 10 that is identified by the identification information. For this reason, the forklift 30 pinpoints the upper unit 10 in accordance with the instruction for drop-off, unloads the upper unit 10 from the under unit 20B, and causes the upper unit 10 to change to the under unit 20A.

As described above, according to the present embodiment, the under unit 20B can convey a plurality of upper units 10. With this configuration, energy efficiency is higher than in a case where a plurality of upper units 10 is conveyed by the individual under units 20A.

If a plurality of upper units 10 is loaded on a plurality of under units 20A a one-to-one basis to form a plurality of vehicles, and the vehicles run individually, an inter-vehicular distance is needed between each two vehicles. In contrast, the vehicle 100 according to the present embodiment, in which a plurality of upper units 10 is loaded on one under unit 20B, requires no individual inter-vehicular distances and has improved conveyance efficiency. This allows, for example, mitigation of congestion during peak traffic.

If the upper unit 10 includes a battery or a solar battery that stores power for running, power can be supplied to the under unit 20B via the joints 14. This makes it possible to subtract a fee of supplied power from a fee for using the under unit 20B and inexpensively use the under unit 20B.

The control methods described in the above embodiment are executed by a processor of a computer reading out a computer program. Such a computer program may be provided to the computer as a non-transitory computer-readable storage medium that is connectable to a system bus of the computer or may be provided to the computer over a network. Examples of the non-transitory computer-readable storage medium include any type of disk, such as a magnetic disk (e.g., a Floppy® disk or a hard disk drive (HDD)) or an optical disc (e.g., a CD-ROM, a DVD, or a Blu-ray Disc). Examples of the non-transitory computer-readable storage medium also include a read-only memory (RCM), a random access memory (PAM), an EPROM, an EEPROM, a magnetic card, a flash memory, an optical card, and any type of medium suitable for storing electronic instructions.

What is claimed is:

1. A vehicle comprising:
an under unit including a drive mechanism that rotates wheels, wherein the under unit includes a loading unit, on which at least one of a plurality of upper units can be loaded, and a connector that is electrically connected to the at least one of the plurality of upper units; and
the at least one of the plurality of upper units loaded on the under unit and having space to store a person or an object,
wherein each of the plurality of upper units includes a joint that joins to a different upper unit that is adjacently loaded, and
wherein the at least one of the plurality of upper units includes a power supplier that supplies power to the under unit via the connector.

2. The vehicle according to claim 1, wherein the plurality of upper units can be loaded on the loading unit in a state of being lined up in at least a vehicle width direction or a height direction of the vehicle.

3. The vehicle according to claim 1, wherein if one of the plurality of upper units is loaded adjacent to a different upper unit on a loading surface of the under unit, at least one of a plurality of the joints that joins to a connector at the loading surface is provided at a position at a predetermined distance from a reference point corresponding to a position where the one of the plurality of upper units contacts the different upper unit.

4. The vehicle according to claim 1, wherein if one of the plurality of upper units is loaded on a loading surface of the under unit, the joint is provided at a position at a predetermined height from the loading surface.

5. The vehicle according to claim 1, wherein the at least one of the plurality of upper units is electrically connected to a different upper unit via the joint.

6. The vehicle according to claim 1, wherein the power supplier includes a battery.

7. The vehicle according to claim 1, wherein
the under unit includes a power supplier that supplies power to the at least one of the plurality of upper units via the connector.

8. The vehicle according to claim 7, wherein the power supplier of the under unit includes a battery.

9. The vehicle according to claim 1, wherein each of the plurality of upper units includes a housing that forms the space and an interior component that is provided in the housing.

10. An upper unit that constitutes a vehicle by being loaded on an under unit including a drive mechanism that rotates wheels, comprising:
a housing having space to store a person or an object; and
a joint provided on an outer surface of the housing and configured to, if a plurality of upper units is loaded adjacent to a different upper unit on a loading unit of the under unit, joins the housing to a housing of the different upper unit; wherein
the under unit includes a connector that is electrically connected to the upper unit, and
the upper unit includes a power supplier that supplies power to the under unit via the connector.

11. The upper unit according to claim 10, wherein the upper unit is loaded adjacent to a different upper unit in at least a vehicle width direction or a height direction of the vehicle.

12. The upper unit according to claim 10, wherein if the upper unit is loaded adjacent to a different upper unit on a loading surface of the under unit, at least one of a plurality of the joints that joins to a connector of the loading surface is provided at a position at a predetermined distance from a reference point corresponding to a position where the upper unit contacts the different upper unit.

13. The upper unit according to claim 10, wherein if the upper unit is loaded on a loading surface of the under unit, the joint is provided at a position at a predetermined height from the loading surface.

14. The upper unit according to claim 10, wherein the upper unit is electrically connected to a different upper unit via the joint.

15. The upper unit according to claim 10, wherein
the upper unit includes a power acceptor that receives power supply from the under unit via the connector.

16. A control device for a vehicle including at least one of a plurality of upper units having space to store a person or an object and an under unit including a loading unit, on which the at least one of the plurality of upper units can be loaded, and a drive mechanism that rotates wheels, comprising a processing unit provided in the under unit and configured to execute:

determining whether the at least one of the plurality of upper units is loaded on the under unit; and causing a joint of the at least one of the plurality of upper units to operate and join the at least one of the plurality of upper units to a different one of upper units which is adjacently loaded on the loading unit, if the at least one of the plurality of upper units is determined to be loaded.

17. The control device according to claim 16, wherein if the at least one of the plurality of upper units and the different upper unit are electrically connected via the joint, the control device acquires an amount of power that flows between the at least one of the plurality of upper units and the different upper unit via the joint and calculates a fee for using the power on the basis of the amount of the power.

18. The control device according to claim 16, wherein if the at least one of the plurality of upper units and the under unit are electrically connected via a connector, the control device acquires an amount of power that flows between the at least one of the plurality of upper units and the under unit via the connector, obtains a running distance, over which the under unit runs with the at least one of the plurality of upper units loaded on the under unit, and calculates a fee for using the under unit on the basis of the amount of the power and the running distance.

* * * * *